May 7, 1940.    G. A. LYON    2,200,205
WHEEL STRUCTURE AND ASSEMBLY
Filed Dec. 21, 1939
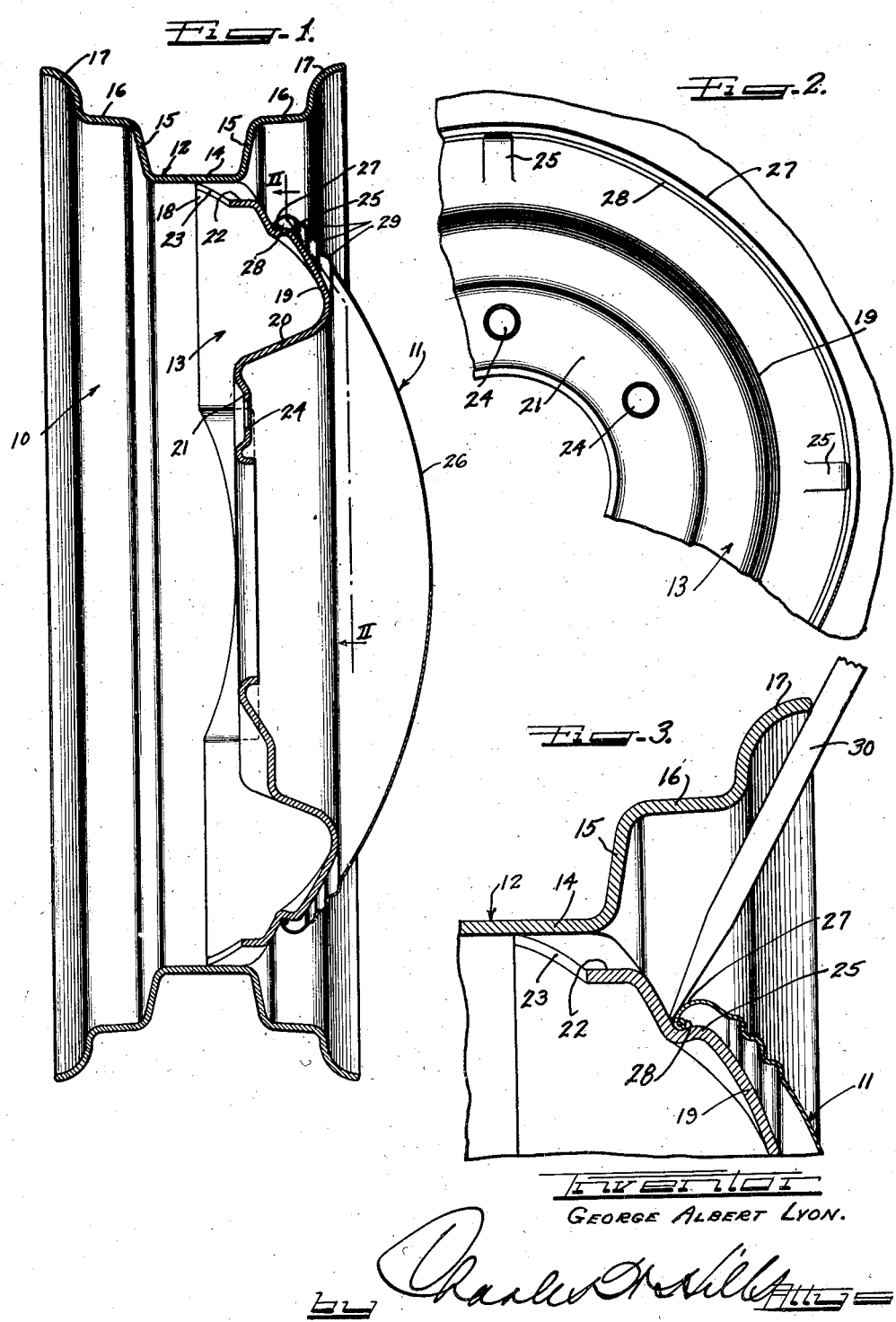
GEORGE ALBERT LYON.

Patented May 7, 1940

2,200,205

UNITED STATES PATENT OFFICE 2,200,205

WHEEL STRUCTURE AND ASSEMBLY

George Albert Lyon, Allenhurst, N. J.

Application December 21, 1939, Serial No. 310,333

2 Claims. (Cl. 301—37)

This invention relates to a wheel structure and assembly, and more particularly to a novel wheel member or wheel cover which cooperates with a vehicle wheel in a novel manner and which is designed in such a manner as to enable quick and easy removal of the wheel member or cover from the wheel.

The majority of vehicle wheels of today are equipped with ornamental wheel members or wheel covers over a substantial part of their outer surfaces. The use of these wheel covers permits a more economical manufacture of vehicle wheels, since the wheels themselves may be designed solely for strength and utility without regard to ornamental appearance, the wheel covers being employed for the latter purpose. The most popular form of wheel cover at the present time is one having a highly polished exterior surface. The exterior surface of the wheel cover may, of course, be finished in any other suitable manner, such as by enameling or the like.

In order to minimize the total cost of the wheel assembly, it is of course necessary to minimize the cost of the wheel disk as well as that of the wheel as much as possible. The thinner the sheet metal stock is which is employed to make the wheel cover, the greater the saving in its manufacturing cost. It has been found that a wheel disk or cover may be constructed of sheet metal stock which is extremely thin when it is properly designed to resist mounting and removal stresses at certain or particular localities.

It is an object of the present invention to provide a novel wheel structure or wheel member for disposition on a wheel.

Another object of the present invention is to provide a novel wheel structure and wheel assembly wherein the wheel structure is made of very thin sheet metal stock and wherein the sheet metal stock is provided with a novel shape to resist and withstand mounting and removing stresses as well as to provide a tight resilient engagement of the wheel structure on the wheel.

A further object of the present invention is to provide a novel wheel structure or wheel cover member having an obliquely radially inwardly and axially rearwardly projecting outer peripheral portion which is terminated by a small tightly rolled edge, the obliquely projecting flange portion being disposed so as to be readily engaged by a pry-off tool to remove the wheel cover from a vehicle wheel.

Another and further object of the present invention is to provide a novel wheel structure or wheel cover member which is economical to manufacture and which is rugged and reliable in use and which cooperates with a vehicle wheel in a novel manner.

Another and still further object of the present invention is to provide a novel wheel disk having a central dome-shaped portion and an obliquely axially rearwardly and radially inwardly projecting outer marginal portion which is terminated in a rolled, continuous, flexible annular bead-like edge which is arranged to be sprung over rigid projections on a vehicle wheel to resiliently retain the wheel disk on the wheel and wherein the central dome-shaped portion is provided with a plurality of ribs or corrugations in proximity to the obliquely extending flange portion to increase the stiffness of the disk in this locality.

The novel features which I believe to be characteristic of my invention are set forth with particularity in the appended claims. My invention itself, however, both as to its organization and manner of construction, together with further objects and advantages therein, may best be understood by reference to the following description taken in connection with the accompanying drawing, in which:

Figure 1 is a vertical sectional view of a vehicle wheel cover assembly;

Figure 2 is a fragmentary front view of a portion of the wheel and wheel cover assembly with a portion of the wheel cover broken away so as to view the assembly along the line II—II of Figure 1; and Figure 3 is an enlarged fragmentary sectional view showing the upper portion of the wheel and wheel cover assembly of Figure 1.

Referring now to the particular embodiment of my invention which is illustrated in the drawing, there is shown a wheel assembly comprising a vehicle wheel 10 and a wheel cover or wheel disk 11. The wheel 10 comprises a rim part 12 and a body part 13. The rim 12 is of the usual drop center type and includes a base flange 14, opposite intermediate side flanges 15, opposite intermediate base flanges 16, and opposite edge portions 17. The drop center rim 12 as illustrated is of the type commonly employed in the automotive vehicle art of the present day, and, as is well known to those skilled in the art, is arranged to receive and accommodate a pneumatic tire (not shown).

The body part 13 of the wheel 10 includes, in general, a rearwardly extending outer flange 18, an outer web portion 19, a generally axially rearwardly and slightly radially inwardly extending inner web portion 20, and a radially inwardly extending wheel mounting flange 21. The rearwardly extending outer flange 18 is secured to the underside of the base flange 14 of the rim 12 in any suitable manner, such as by welding or riveting (not shown). Circumferentially spaced portions of the flange 18 are depressed radially inwardly as at 22 to permit circulation of air through the wheel. The rear edges 23 of the depressed portions 22 are cut back as is clearly shown in Figure 1 of the drawing.

The wheel mounting flange 21 is provided with an annular series of apertures 24 for the reception of the usual wheel mounting bolts (not shown) which bolts are arranged to extend therethrough into engagement with the hub portion or brake drum of the vehicle (not shown).

The outer web portion 19 is provided with a plurality of circumferentially spaced radially outwardly projecting short ribs or protuberances 25. These short ribs 25 may be formed on the wheel 10 in any suitable manner, and may be initially separate pieces which are welded or otherwise secured to the wheel or they may be integral with the wheel as is shown in Figure 1 and formed by pressing up portions of the web 19. As is indicated in Figures 1 and 2, four of these short ribs or protuberances are employed in the embodiment of the invention illustrated and described herein.

The wheel cover or wheel disk 11 includes in general a central dome-shaped portion 26 and an obliquely rearwardly and radially inwardly outer marginal portion or flange 27 which terminates in a continuous, flexible, annular, tightly rolled edge or bead 28. In the radial outer region of the central dome-shaped portion 26 of the disk 11, just before it merges into the obliquely extending flange portion 27, a plurality of corrugations 29 are provided to stiffen the disk in this region.

When the wheel cover or wheel disk 11 is mounted on the wheel 10 a continuous, annular, flexible curled or rolled edge 28 is sprung over the short ribs or projecting portions 25 of the wheel 10 to a nested position as is clearly shown in Figure 3. The wheel disk 11 is tightly held in secured engagement on the wheel 10 by its own inherent resiliency.

As is clearly shown in Figure 3 a pry-off tool 30, such as a screw-driver, tire tool, or the like, may be inserted behind the obliquely rearwardly extending flange 27 and then fulcrumed about the outer edge of the rim 12 to dislodge the wheel disk 11 from the wheel. The end of the pry-off tool 30 engages the obliquely rearwardly projecting flange 27 which flange provides a sufficiently large surface to render it easily engageable by the pry-off tool 30.

The tightly curled or rolled extremity of the flange 27, which is indicated by the reference numeral 28, comprises a sufficient reinforcement of the relatively thin sheet metal employed to form the wheel disk 11 so that it will not be deformed when it is sprung over the projecting ribs or portions 25. The corrugations or ribs 29 which are formed in the dome-shaped portion 26 of the wheel disk 11 stiffen the wheel disk 11 in the general region where it is being stressed by the flexing of the continuous, annular rolled edge 28 as it is mounted on the wheel 10. This provision of a corrugated or ribbed portion 29 near the radial outer portion of the wheel disk 11 has been found very desirable in a wheel disk of the design herein described for in some cases it was found that the wheel disk 11 tended to buckle in this region when it was being mounted on the wheel.

While I have shown a particular embodiment of my invention, it will, of course, be understood that I do not wish to be limited thereto, since many modifications may be made, and I, therefore, contemplate by the appended claims to cover all such modifications as will fall within the true spirit and scope of my invention.

I claim as my invention:

1. In a wheel structure including a wheel having rim and body parts one of which parts has rigid protuberance means arranged in a predetermined circle, a circular cover member of such very thin metallic sheet as to require reinforcement to resist indentation and permanent deformation upon application and removal of the cover member to and from the wheel, said cover member having a rearwardly extending flange which is relatively short and inclined at an angle to the outer portion of the cover member and terminates in a continuous circular edge portion, said edge portion comprising a small tightly rolled continuous circular edge flexible into retaining cooperation with said protuberance means, said flange providing a surface of substantial area for engagement by a pry-off tool to remove said cover member from said wheel, and said edge by reason of its being tightly rolled and small resisting permanent indentation when it is pressed into retaining engagement with said protuberance means as well as when said flange is engaged by a pry-off tool, said outer cover portion comprising an integral rib-like shoulder for reinforcing the cover member in the vicinity of the flange, so as to serve as a backing against which the flange flexes.

2. A wheel structure as defined in claim 1 in which the outer cover portion comprises a resilient crown portion having a plurality of integral reinforcing ribs adjacent the junction of said outer cover portion and said flange.

GEORGE ALBERT LYON.